United States Patent
Lindsay et al.

(10) Patent No.: US 6,726,750 B2
(45) Date of Patent: Apr. 27, 2004

(54) APPARATUS AND METHOD FOR EFFICIENT RECOVERY OF VOLATILE ORGANIC COMPOUNDS

(75) Inventors: Mitchell H. Lindsay, Park City, UT (US); Moha Shah, Salt Lake City, UT (US)

(73) Assignee: CH2M Hill, Inc., Englewood, CO (US)

( * ) Notice: Subject to any disclaimer, the term of this patent is extended or adjusted under 35 U.S.C. 154(b) by 61 days.

(21) Appl. No.: 10/021,856

(22) Filed: Dec. 13, 2001

(65) Prior Publication Data

US 2002/0046652 A1 Apr. 25, 2002

Related U.S. Application Data

(63) Continuation-in-part of application No. 09/588,152, filed on Jun. 5, 2000, now Pat. No. 6,352,575.

(51) Int. Cl.[7] ............................................. B01D 53/14
(52) U.S. Cl. ........................... 95/227; 95/228; 95/237; 96/242; 96/266
(58) Field of Search .................... 96/234, 242, 266, 96/265, 290; 95/237, 149, 227, 228, 229, 238, 239, 240, 204

(56) References Cited

U.S. PATENT DOCUMENTS

| 2,947,379 A | * | 8/1960 | Aubrey |
| 3,230,690 A | | 1/1966 | Nishioka |
| 3,232,027 A | | 2/1966 | Lorenz et al. |
| 3,232,029 A | | 2/1966 | Evans, Jr. |
| 3,778,968 A | * | 12/1973 | Parker, Sr. |
| 3,778,969 A | * | 12/1973 | Sudduth |
| 3,830,074 A | * | 8/1974 | Nichols |
| 3,867,111 A | * | 2/1975 | Knowles |
| 4,043,769 A | | 8/1977 | Nishino et al. |
| 4,102,983 A | * | 7/1978 | Yamase et al. |
| 4,138,230 A | | 2/1979 | Thompson |
| 4,353,715 A | | 10/1982 | Mir et al. |
| 4,378,235 A | | 3/1983 | Cosper et al. |
| 4,383,838 A | | 5/1983 | Barten et al. |

(List continued on next page.)

Primary Examiner—Duane S. Smith
(74) Attorney, Agent, or Firm—Swanson & Bratschun LLC

(57) ABSTRACT

An apparatus for efficiently removing VOC from a plurality of remotely located sources of VOC contaminated gas streams includes a plurality of liquid absorbers, each located near and communicating with a source of a VOC contaminated gas stream, the liquid absorbers associating the VOC with a scrubbing liquid. A gas conduit is associated with each liquid absorber to allow for the recycling of properly conditioned gas to the VOC source. A conduit is connected to each liquid absorber for conveying VOC laden scrubbing liquid from the liquid absorber to a separating apparatus in fluid communication with each of the conduits. A conduit recycles the scrubbing liquid from the separating apparatus to at least one of the plurality of liquid absorbers. A heat exchanger associated with the scrubbing liquid after separation transfers heat to the scrubbing liquid prior to separation, or to an HVAC system, or to the scrubbing liquid prior to the liquid absorber. An energy efficient method for removing VOC from a plurality of remotely located sources of gas streams contaminated with VOC featuring recycling of gas and scrubbing fluid and heat transfer.

10 Claims, 3 Drawing Sheets

U.S. PATENT DOCUMENTS

| | | |
|---|---|---|
| 4,541,967 A | 9/1985 | Masaki |
| 4,574,005 A | 3/1986 | Cobbs, Jr. et al. |
| 4,689,054 A | 8/1987 | Vara et al. |
| 4,830,639 A | 5/1989 | Grunewald et al. |
| 4,871,450 A | 10/1989 | Goodrich et al. |
| 5,017,351 A | 5/1991 | Rafson |
| 5,076,822 A * | 12/1991 | Hewitt |
| 5,198,000 A | 3/1993 | Grasso et al. |
| 5,330,563 A | 7/1994 | Yamase et al. |
| 5,529,612 A | 6/1996 | Troost |
| 5,618,333 A | 4/1997 | Buchholz, Jr. et al. |
| 5,634,962 A * | 6/1997 | Trahan et al. |
| 5,681,369 A | 10/1997 | Osborne |
| 5,772,734 A | 6/1998 | Baker et al. |
| 5,882,522 A | 3/1999 | Matsumoto et al. |
| 6,015,451 A * | 1/2000 | Anderson et al. |
| 6,352,575 B1 * | 3/2002 | Lindsay et al. |
| 2002/0046652 A1 * | 4/2002 | Lindsay et al. |

* cited by examiner

APPARATUS AND METHOD FOR EFFICIENT RECOVERY OF VOLATILE ORGANIC COMPOUNDS

This application is a continuation-in-part of U.S. patent application Ser. No. 09/588,152 filed on Jun. 5, 2000 now U.S. Pat. No. 6,352,575.

TECHNICAL FIELD

The present invention is directed toward air pollution control equipment, and more particularly toward an apparatus and method for the energy efficient recovery of volatile organic compounds (VOC) from an air stream.

BACKGROUND ART

Pollution of the atmosphere by VOC is a pervasive problem. Control of VOC emissions from large, discreet sources can be accomplished relatively efficiently and economically. Much more difficult to tackle has been the problem of VOC emissions from smaller discrete sources dispersed within a large facility. For example, an automobile assembly plant or other large scale manufacturing facility may engage in operations such as degreasing and painting in remote locations. In some cases, the plant operators simply vent the VOC contaminated air stream to the atmosphere without further treatment. Not only does this have a detrimental impact on the environment, it may also be a violation of state and federal air pollution laws. The prior art has tended toward pollution control apparatus associated with each remotely located source of VOC contaminated air. Some facilities attempt to capture the VOC for disposal. Others attempt to recover the VOC for reuse. Those facilities capturing the VOC for disposal are subject to more stringent emission control standards than those recovering the VOC for reuse.

Methods and apparatus for recovering VOC contaminants from a gas stream are known in the art. Representative is Grasso, U.S. Pat. No. 5,198,000. Grasso discloses subjecting a VOC laden air stream to an absorption apparatus such as a packed column using a scrubbing liquid which absorbs the VOC from the gas stream and discharges the treated gas into the atmosphere. Grasso further teaches that the VOC laden scrubbing liquid is subjected to a separation apparatus which maybe a distillation column, stripping column, evaporator, membrane stripping device or the like. The separated scrubbing liquid is recycled to the absorption apparatus and the VOC is captured for reuse or disposal.

Apparatus such as that taught by Grasso suffer from certain inherent energy inefficiencies. For example, an application such as a paint booth may require that the air in the booth be conditioned to an appropriate temperature and/or humidity for the application or curing process. If VOC contaminated air from the paint booth is exhausted to the atmosphere after the absorption process, a great deal of thermal energy can be lost. In addition, further energy input may be required to pre-condition new air for the paint booth. Energy losses are also inherent in the separation process. Many separation methods such as distillation require a large heat input. However apparatus such as that taught by Grasso do not provide for the capture and recycling of the thermal energy added to the scrubbing liquid during separation.

The present invention is directed toward overcoming one or more of the problems discussed above.

SUMMARY OF THE INVENTION

A first aspect of the present invention is an energy efficient apparatus for removing VOC from a source of a VOC contaminated gas stream. The apparatus includes a liquid absorber, such as a stripping tower, communicating with a source of a VOC contaminated gas stream. The liquid absorber associates the VOC with a scrubbing liquid. In addition, the scrubbing liquid exchanges heat and or humidity with the contaminated gas stream. The preferred scrubbing liquid is a synthetic aromatic hydrocarbon blend, which is suitable for both VOC scrubbing and use as a heat transfer fluid. Following substantial cleaning, the temperature/humidity conditioned gas is conveyed from the liquid absorber and is recycled to the source of a VOC contaminated gas stream, typically an enclosed workspace such as a paint booth. The workspace may be under positive or negative pressure. The recycling of gas to the VOC source results in significant energy savings since there is reduced need to pre-heat cool make-up or outside air to the appropriate temperature for use at the VOC source. A conduit is connected to the liquid absorber for conveying VOC laden scrubbing liquid from the liquid absorber to a separator in fluid communication with the conduit. The separator receives the VOC laden scrubbing liquid from the liquid absorber and separates the VOC from the scrubbing liquid. The apparatus may further include a conduit for recycling the scrubbing liquid from the separator to the liquid absorber. The separator is preferably a distillation column and the liquid absorber is preferably a stripping tower. A heat exchanger may be provided in operative association between the separated scrubbing liquid and the VOC laden scrubbing liquid to be received in the distillation column for transferring heat from the separated scrubbing liquid to the VOC laden scrubbing liquid before it enters the distillation column. Preheating the VOC laden scrubbing liquid prior to distillation reduces the amount of energy which must be supplied to complete the separation of the VOC from the scrubbing liquid, and increases the overall energy efficiency of the recovery system. Alternatively, the heat recovered from the separated scrubbing liquid can be used to supplement the HVAC system of the facility. Or, a portion of the heat may be transferred to the scrubbing liquid prior to its use in the absorber. If the temperature of the scrubbing liquid is adjusted to a select level by heat exchange prior to the scrubbing process, the scrubbed gas which is recycled back to the source can be conditioned to the most effective temperature for use at the VOC source.

A second aspect of the present invention is an energy efficient method for removing VOC from a gas stream contaminated with VOC. The method includes contacting the VOC contaminated gas stream with a scrubbing liquid close to the VOC containing gas stream source to associate the VOC with the scrubbing liquid. In addition, the scrubbing liquid exchanges heat with the contaminated gas stream. The preferred scrubbing liquid is a synthetic aromatic hydrocarbon blend, which is suitable for both VOC scrubbing and use as a heat transfer fluid. A hydrophobic scrubbing liquid will facilitate heat transfer without effecting the moisture content of the gas stream. The substantially cleaned and properly conditioned gas is then re-circulated back to the VOC source. The VOC laden scrubbing liquid is conveyed to a separator. There the VOC is separated from the scrubbing liquid. The separation of the VOC from the scrubbing liquid may be accomplished by distillation. If so, heat is preferably exchanged between the scrubbing liquid separated from the VOC and the VOC laden scrubbing liquid before distillation of the VOC laden scrubbing liquid. Alternatively, any heat removed from the scrubbing liquid by means of a heat exchange may be used to supplement the facility HVAC system. Or, a portion of the heat may be transferred to the scrubbing liquid prior to its use in the absorber. If the temperature of the scrubbing liquid is adjusted to a select level by heat exchange prior to the scrubbing process, the scrubbed gas which is recycled back to the source can be conditioned to the most effective temperature for use at the VOC source.

The above method and apparatus may in an alternative embodiment provide for consolidation of VOC laden scrubbing liquid from a number of remotely located sources at a single separating apparatus. This allows for economies of scale in constructing a single large separating apparatus as opposed to many discretely located small separating apparatus. This advantage can be particularly acute when the separation is conducted in a distillation column where efficient operation of the distillation column requires a continuous supply of VOC laden scrubbing liquid.

The system is also substantially closed, thereby providing capture of process air, the VOC and the scrubbing liquid for reuse. Because the method and apparatus are a recovery system, lower VOC removal efficiencies from the VOC contaminated gas streams may be permitted by regulation than those required for disposal systems, thereby making compliance with environmental regulations easier. In addition, the increased energy efficiency of the system resulting from the heat exchange strategies disclosed above can significantly reduce operating energy and material costs.

DETAILED DESCRIPTION OF THE PREFERRED EMBODIMENT

Figure 1:
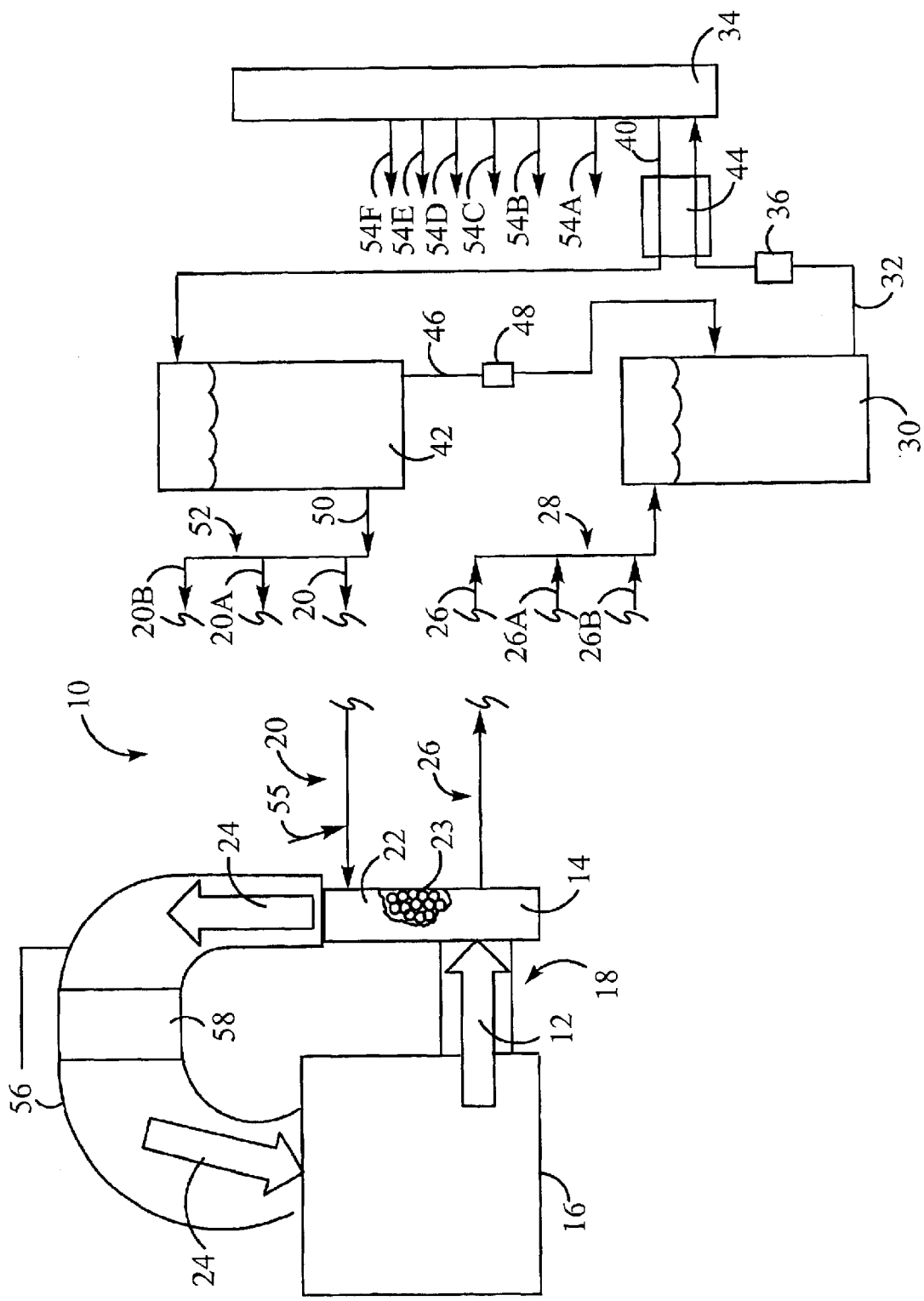
FIG. 1 is a schematic representation of an apparatus for the energy efficient recovery of volatile organic compounds featuring heat exchange at the inlet and outlet of the separating means.

The apparatus for the energy efficient recovery of volatile organic compounds 10 of the present invention is shown schematically in FIG. 1. A VOC contaminated gas stream 12 enters a liquid absorber 14 from one of a variety of sources of a VOC contaminated gas stream 16. The source 16 may include, by way of example, a paint booth, a degreasing booth, a stripping station or the like. Typically, there are a variety of sources of VOC in a large manufacturing facility and these sources are often remotely located from one another. The apparatus 10 contemplates that the VOC contaminated gas stream 12 is conveyed to an associated liquid absorber 14 through a duct 18.

The liquid absorber 14 can be anyone of a number of apparatus for promoting absorption of VOC from the gas stream by a scrubbing liquid. In this application, absorption, is the transfer of a soluble component from a gas-phase mixture into a scrubbing liquid wherein the volatility of the scrubbing liquid is low under the process conditions. The energy efficiency of the VOC removal process can be enhanced if the scrubbing liquid is also functioning as a heat transfer fluid (e.g. a synthetic aromatic hydrocarbon blend heat transfer fluid such as Dowtherm (TM)). In addition to absorption of VOC a properly selected and temperature controlled scrubbing fluid can condition the temperature of the gas stream 12 which in turn can limit the need for supplemental conditioning prior to re-use at the VOC source 16. The temperature of the scrubbing liquid prior to the absorber 22 can be affected by heat exchange through heat exchanger 44 which in one embodiment is also associated with the scrubbing liquid conduit 40 subsequent to separation.

In addition to the capture of a gas phase of a VOC, the liquid absorber also absorbs suspended liquid droplets of VOC. The liquid absorber 14 may be a packed column, a tray column, a wet-wall or falling film column, a bubble column, a spray chamber, a membrane system or an agitated vessel. The scrubbing liquid and the gas may be contacted in a batch process, e.g., in an agitated vessel, or in a continuous process, e.g., in a packed column. In the preferred embodiment, the absorption apparatus is a packed stripping column. In this embodiment, the scrubbing liquid is introduced through a conduit 20 to the top of a column 22 that is filled with a packing medium 23, commonly plastic "saddles" or "balls." As the scrubbing liquid flows by force of gravity over the packing medium, a large surface area of scrubbing liquid is formed for increasing the gas/liquid interface. The cleaned gas stream 24 which has been conditioned with respect to temperature by the scrubbing liquid can be exhausted at the top of the stripping column 22 and recycled via a gas conduit 56 back to the VOC emission source 16. Additionally, the purged gas stream 24 can be further cleaned in a filter 58 associated with the gas conduit 56. The VOC laden scrubbing liquid exits the bottom of the stripping column 22 through outlet conduit 26.

Figure 2:
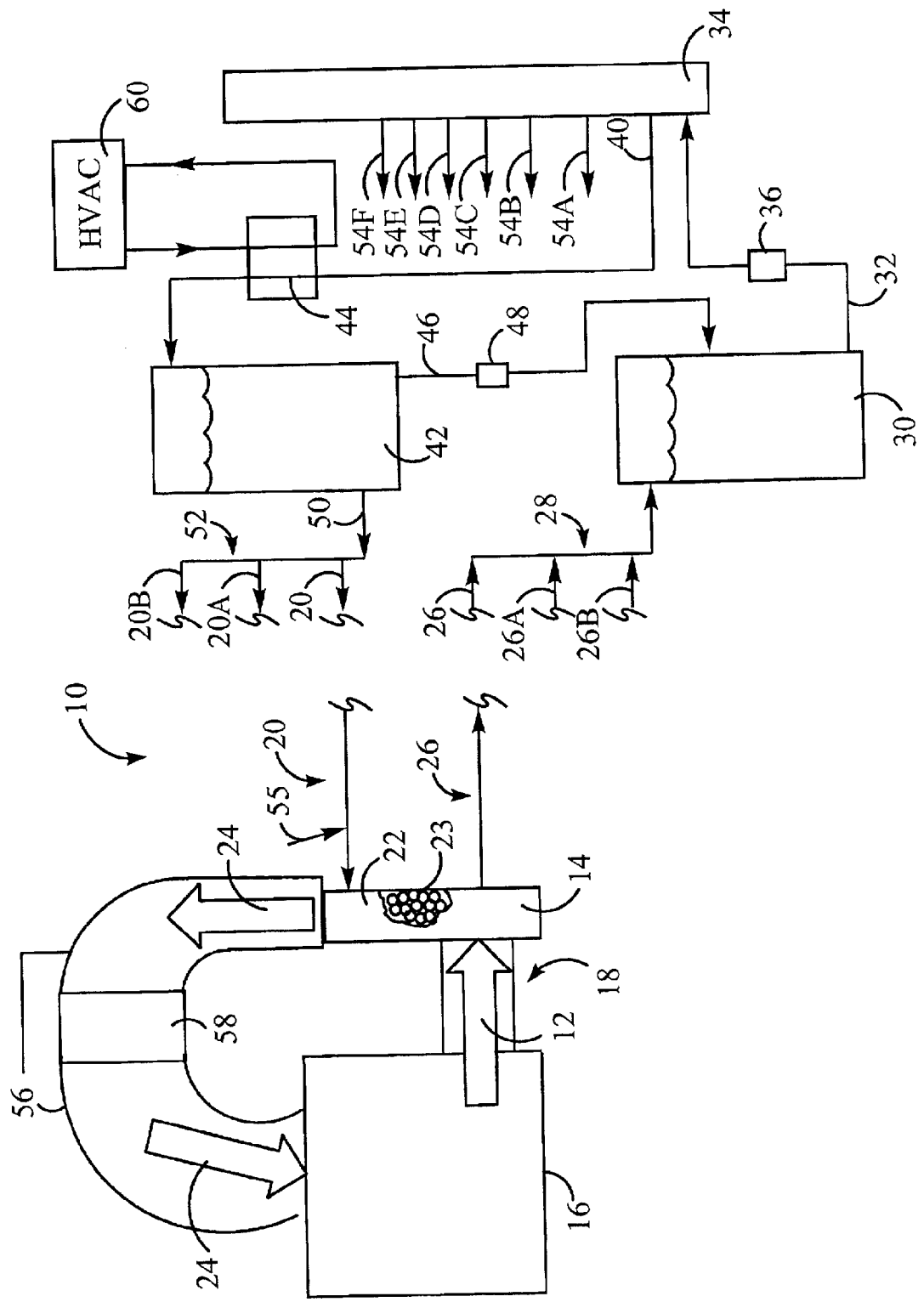
FIG. 2 is a schematic representation of an apparatus for the energy efficient recovery of volatile organic compounds featuring heat exchange between the scrubbing liquid circuit and an external HVAC system.
Figure 3:
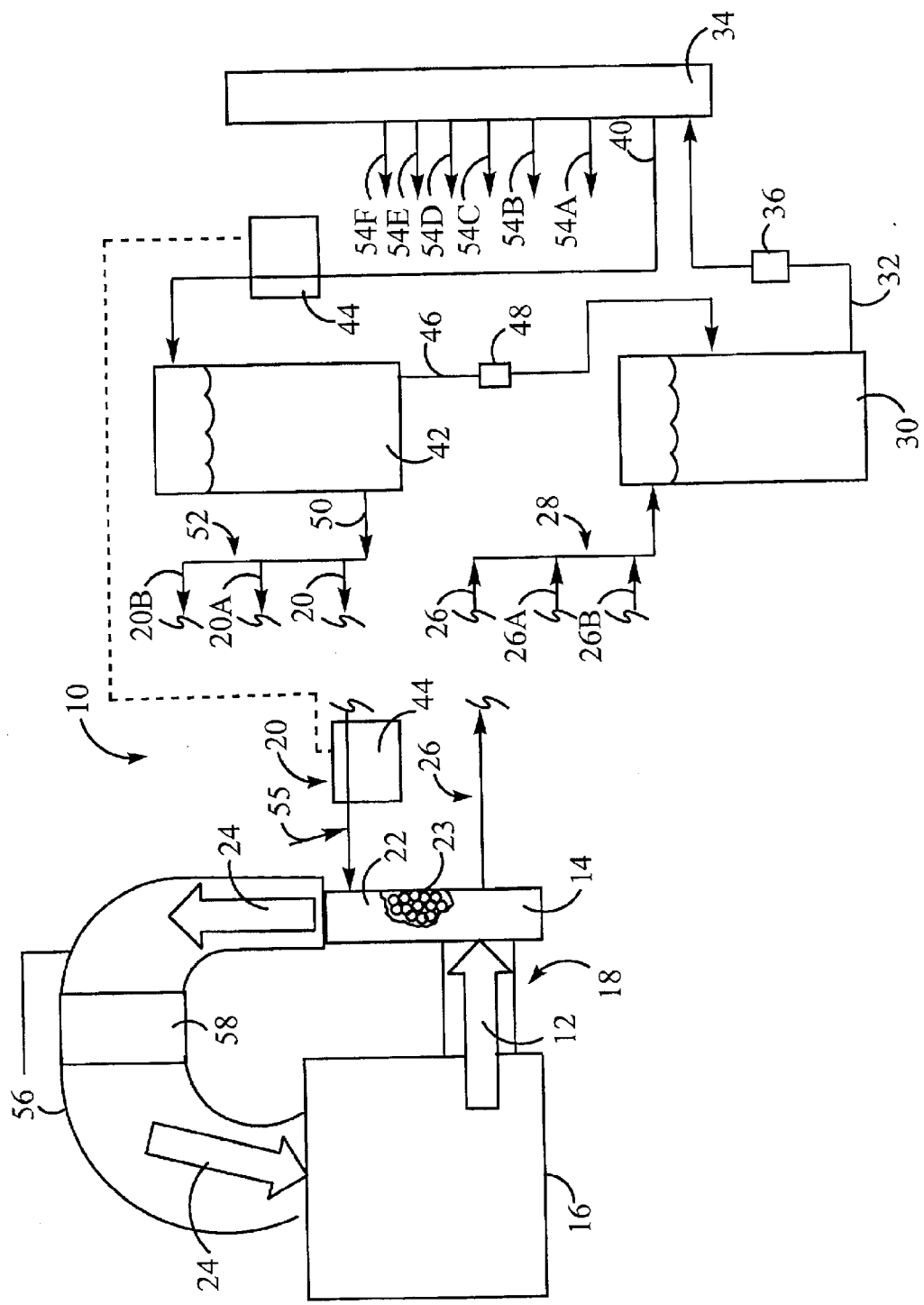
FIG. 3 is a schematic representation of an apparatus for the energy efficient recovery of volatile organic compounds featuring heat exchange between the scrubbing liquid circuit after the separating means outlet and before the absorber inlet.

The liquid absorber 14 may be external to, internal to or an integral part of the VOC contaminated air stream source 16. In any event, a liquid absorber 14 is located near each VOC emission source. Outlet conduits 26A and 26B represent outlet conduits from other liquid absorbers (not shown) identical to but located remotely from liquid absorber 14. Outlet conduits 26, 26A and 26B combine at a receiving manifold 28 and flow into a buffer reservoir 30. A conduit 32 connects the buffer reservoir with a separating apparatus 34 for separating the VOC from the scrubbing liquid. The separating apparatus 34 is preferably a fractionating distillation column, although it may be a stripping column, an evaporator, a membrane stripping device or any other apparatus suitable for separating solids for disposal, VOC for reuse and scrubbing liquid for recirculation. A valve or flow regulator 36 is provided in fluid communication with the conduit 32 to provide VOC laden scrubbing liquid from the buffer reservoir 30 to the separating apparatus 34 at a substantially constant, select rate of flow. Separated scrubbing liquid exits the separating apparatus 34 through return conduit 40 which discharges into a scrubbing liquid reservoir 42. Where the separating apparatus functions by heating the VOC laden scrubbing liquid to effect separation, for example in the preferred embodiment where the separating apparatus is a fractionating distillation column, a heat exchanger 44 is operatively associated with the return conduit 40 and the conduit 32 to allow for the exchange of heat from the separated scrubbing liquid and the VOC laden scrubbing liquid before the VOC laden scrubbing liquid enters the separating apparatus 34, thereby increasing the efficiency of the separation process. In the alternative, as shown in FIG. 2, the heat exchanger 44 can be operatively associated with the facility HVAC system 60. Or, as shown in FIG. 3, the heat exchanger 44 can be operatively associated with the conduit 20 at the top of the stripping column 22. This arrangement allows for the use of heat from the scrubbing liquid after separation to control the temperature of the scrubbing fluid prior to the scrubbing process. Thus, the scrubbing fluid can condition the exhaust gas stream 24 to a preferred temperature prior to recycling to the source of a VOC contaminated gas stream 16.

A recirculation conduit 46 provides for fluid communication between the scrubbing liquid reservoir 42 and the buffer reservoir 30. A flow control such as a valve or flow regulator 48 is in fluid communication with the recirculating conduit and allows for selective recirculation of separated scrubbing liquid to the buffer reservoir 30. This ensures a constant supply of liquid to maintain continuous operation of the separating apparatus 34. For example, the rate of flow from the scrubbing liquid reservoir 42 to the buffer reservoir 30 can be adjusted as required to maintain a select flow rate from the buffer reservoir to the separating apparatus 34. Recycling conduit 50 connects to a distribution manifold 52 which is in fluid communication with a number of scrubbing liquid conduits 20, 20A, 20B. Scrubbing liquid conduits 20, 20A and 20B return the separated scrubbing liquid to the various remotely located liquid absorbers, as illustrated with respect to scrubbing liquid conduit 20 and liquid absorber 14.

In the preferred embodiment, where the separating apparatus 34 is a fractionating distillation column, the VOC separated from the scrubbing liquid by the separating apparatus exits the separation apparatus in its constituent parts through a number of outlet conduits 54A–54F. Representative VOC could include ethers, methylethyl ketone, isopropyl alcohol, methyl chloride, acetone and toluene. Those skilled in the art will recognize that the above list of examples is not exhaustive and in fact the VOC recovered will be a function of the VOC introduced into the recovery apparatus from the various sources of VOC contaminated gas streams.

Make up scrubbing liquid 55 is provided to each of the scrubbing liquid conduits 20, 20A and 20B from a second scrubbing liquid reservoir (not shown) to insure an adequate supply of scrubbing liquid to the liquid absorber 14. Although not shown, those skilled in the art will appreciate that various pumps and valves can be provided in the system as needed to insure continuous circulation of the VOC laden scrubbing liquid, the separated scrubbing liquid, make up scrubbing liquid and recovered VOC.

Condensers (not shown) can be provided in fluid communication with the outlet conduits 54A–54F to form condensed VOC streams. The condensed VOC streams may be reclaimed as a resource rather than being incinerated, discharged to the atmosphere or otherwise being disposed of. For example, the condensed VOC can be recombined, as appropriate, and returned to the source of VOC laden air 16 for use in the industrial process creating the VOC contaminated air stream. In the alternative, condensed VOC can be used as a fuel.

The apparatus and method for recovery of VOC in accordance with the present invention allows for the safe and energy efficient conveyance of VOC laden scrubbing liquid from a number of remotely located liquid absorbers for separation of the VOC from the scrubbing liquid at a single separation apparatus. This enables efficiencies of scale in the building and operation of separating apparatus, lowering construction and operating costs. By providing the buffer reservoir which in turn is in fluid communication with the scrubbing liquid reservoir, a constant supply of scrubbing liquid to the separation apparatus can be insured, thereby enabling continuous operation of the separating apparatus and the highest degree of efficiency. Because the system allows for recovery and reuse of the VOC, as part of an industrial process, it is not subject to as high a removal efficiency of the VOC at the liquid absorber as is required in an adsorption or abatement apparatus that does not allow recovery. All these many advantages are achieved by a unique combination of known elements which can be produced relatively inexpensively, are highly reliable and can be operated very efficiently.

The implementation of the above described apparatus and methods which are designed to increase the overall energy efficiency of the recovery system, such as the use of a heat exchanger 44, or the re-circulation of exhaust gas from the liquid absorber 14 to the source of a VOC contaminated air stream 16 is not limited to VOC recovery systems where multiple VOC contaminated gas sources 16 are associated with multiple liquid absorbers 14 which in turn are associated with a single separating apparatus 34. The above described energy efficiency enhancing apparatus and methods can be implemented in VOC recovery systems of any configuration.

What is claimed is:

1. An apparatus for removing volatile organic compounds (VOC) from VOC sources comprising:

a gas circuit comprising a plurality of gas streams flowing away from and back to a plurality of remotely located VOC sources, each gas stream being associated with one of a plurality of absorbers, each absorber located near and communicating with both one of the gas streams and the scrubbing liquid circuit, the gas streams being VOC contaminated gas streams after the VOC sources and clean gas streams before the VOC sources;

a scrubbing liquid flowing in a scrubbing liquid circuit;

an absorber having a scrubbing liquid inlet, the absorber communicating with both the gas circuit and the scrubbing liquid circuit and the absorber associating VOC from the VOC contaminated gas streams with the scrubbing liquid; and a heat exchanger in fluid communication with the scrubbing liquid flowing in the scrubbing liquid circuit at a first point away from the scrubbing liquid inlet, the heat exchanger also in fluid communication with the scrubbing liquid circuit at a second point prior to the scrubbing liquid inlet to control the temperature of the scrubbing liquid immediately prior to the absorber, whereby the scrubbing liquid in the absorber conditions the gas stream to a temperature level appropriate for use as the gas stream is recycled to at least one of the VOC sources.

2. The apparatus of claim 1 further comprising a separating means in the scrubbing liquid circuit for separating the VOC from the scrubbing liquid, the separating means having an inlet and an outleta heat exchanger in fluid communication with the scrubbing liquid flowing in the scrubbing liquid circuit at a first point away from the separating means inlet, the heat exchanger also being in fluid communication with the scrubbing liquid circuit at a second point prior to the separating means inlet to control the temperature of the scrubbing liquid immediately prior to the separating means inlet to increase the efficiency of the separating process.

3. An apparatus for removing volatile organic compounds (VOC) from VOC sources comprising:

a gas circuit comprising a plurality of gas streams flowing away from and back to a plurality of remotely located VOC sources each gas stream being associated with one of a plurality of absorbers, each absorber located near and communicating with both one of the gas streams and the scrubbing liquid circuit;

a scrubbing liquid flowing in a scrubbing liquid circuit;

an absorber having a scrubbing liquid inlet, the absorber communicating with both the gas circuit and the scrubbing liquid circuit and the absorber associating VOC from the VOC contaminated gas stream with the scrubbing liquid; and a heat exchanger in fluid communication with the scrubbing liquid flowing in the scrubbing liquid circuit, the heat exchanger also in fluid communication with a third fluid circuit.

4. The apparatus of claim 3 wherein the third fluid circuit is a facility heating ventilation and air conditioning system.

5. A method for removing volatile organic compounds (VOC) from a VOC source comprising:

a. circulating gas through the VOC source to create a VOC contaminated gas steam;

b. scrubbing the VOC contaminated gas stream with a scrubbing liquid contained in a scrubbing liquid circuit to associate the VOC with the scrubbing liquid and create a cleaned gas stream;

c. selectively controlling the temperature of the cleaned gas stream by means of heat exchange between an HVAC circuit; and d. returning the cleaned and conditioned gas stream to the VOC source.

6. The method of claim 5 further comprising step e., separating the VOC from the scrubbing liquid.

7. The method of claim 6 wherein step c. is exchanging heat between a first point in the scrubbing fluid circuit and a second point prior to separating the VOC from the scrubbing liquid.

8. The apparatus of claim 3 further comprising the third fluid circuit being in fluid communication with the VOC source.

9. The apparatus of claim 8 wherein the third fluid circuit is a facility heating ventilation and air conditioning system.

10. The apparatus of claim 8 wherein the fluid flowing in the third fluid circuit is air.

* * * * *